UNITED STATES PATENT OFFICE.

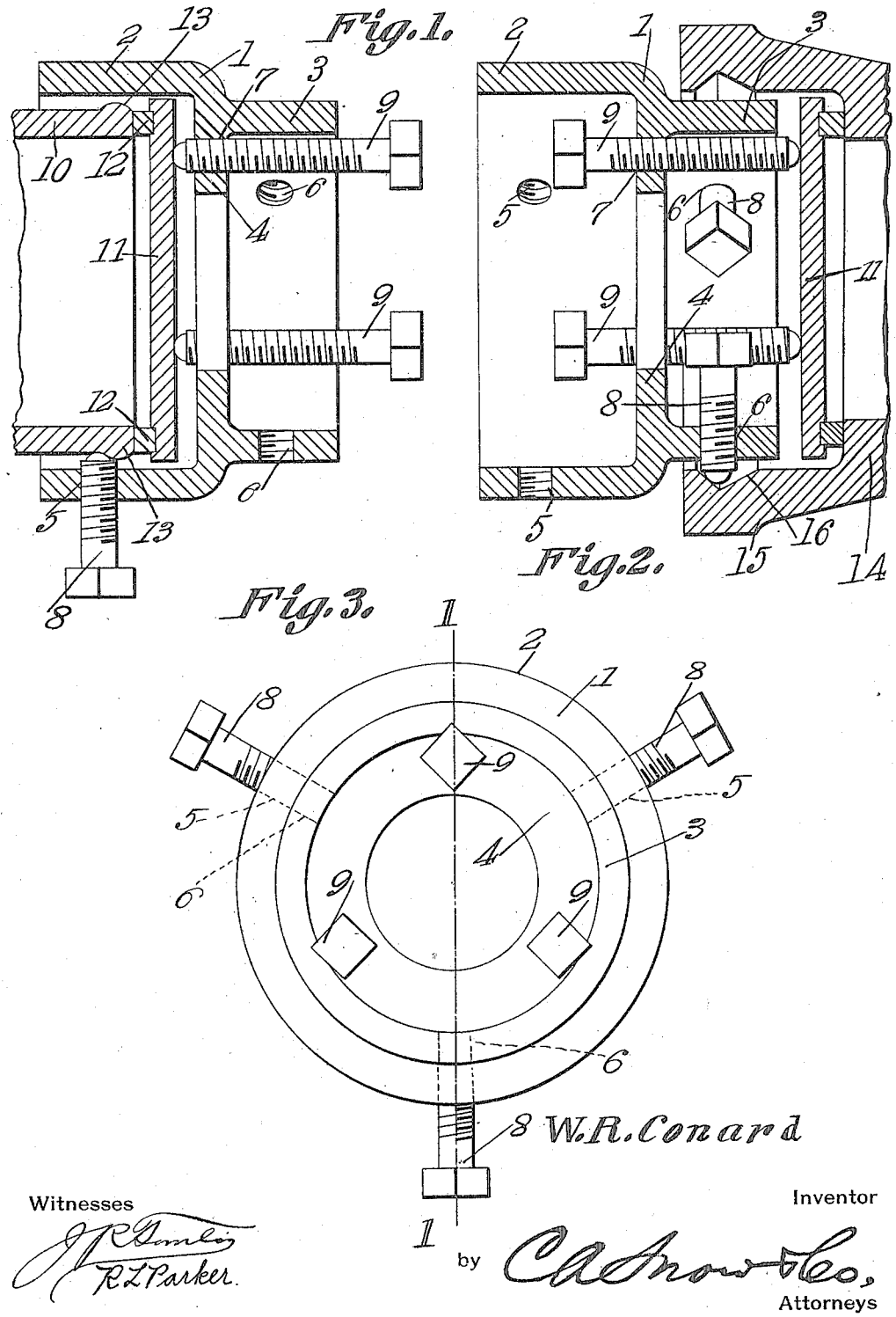

WILLIAM R. CONARD, OF BURLINGTON, NEW JERSEY.

COMBINATION PLUG AND CAP.

1,264,367.  Specification of Letters Patent.  Patented Apr. 30, 1918.

Application filed October 11, 1917. Serial No. 195,984.

*To all whom it may concern:*

Be it known that I, WILLIAM R. CONARD, a citizen of the United States, residing at Burlington, in the county of Burlington and State of New Jersey, have invented a new and useful Combination Plug and Cap, of which the following is a specification.

The present invention appertains to means for closing or stopping up the ends of pipes or conduits, and aims to provide a novel and improved device applicable to both the bell and spigot ends of pipes and conduits, whether they be straight or of different shapes known as "specials or fittings."

It is the object of the invention to provide a simple and inexpensive yet thoroughly practical and efficient device which can be placed upon the spigot end of a pipe or conduit for closing the same, and which can also be fitted within the bell end of a pipe or conduit for performing the same function in stopping up the end of the passage.

The present device is of special construction in order that it is applicable to both the bell and spigot ends of pipes and conduits, and has means for holding it in place in either use thereof, and means for tightly closing the end of the pipe.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a diametrical section taken on the line 1—1 of Fig. 3 illustrating the device applied to the spigot end of a pipe.

Fig. 2 is a similar view illustrating the device applied to the bell end of a pipe.

Fig. 3 is an end view of the device in the position illustrated in Fig. 1.

The device embodies an annular casting or body 1 having its opposite end portions of different diameters, to provide a cap 2 of relatively large diameter and a plug 3 of smaller diameter. The casting or body 1 has an annular inwardly projecting flange 4 between the cap 2 and plug 3. The rims or flanges of the cap and plug have the respective radial threaded apertures 5 and 6, and the flange 4 has the longitudinal threaded apertures 7. Set screws 8 are adapted to be threaded inwardly through the apertures 5 and outwardly through the apertures 6, and jam screws 9 are adapted to be threaded in either direction through the apertures 7, the screws preferably having rounded ends.

When the device is used upon the spigot end 10 of a pipe or conduit, the cap 2 is passed over said end of the pipe, with a closure disk or plate 11 within the cap, said disk having a gasket 12 to rest against the end of the pipe. The screws 8 are then screwed inwardly through the apertures 5 and bear against the pipe behind the bead or rib 13, whereby the screws in being tightened will securely hold the body 1 in place on the pipe. The screws 9 are then threaded inwardly through the apertures 7 from within the annular plug 3, and act against the disk or plate 11 to force it toward the end of the pipe, thereby tightly closing the passage. The disk or plate 11 is of a size to fit within the cap 2, but is of substantially the same diameter as the plug 3.

When the device is used in the bell end of a pipe or conduit 14, as seen in Fig. 2, the plug 3 is inserted within the bell 15, the disk or plate 11 being first inserted within the bell, and the set screws 8 are threaded outwardly through the apertures 6 to seat in the annular groove 16 of the bell, thereby securing the device in place, so that the screws 9 can be threaded through the apertures 7 from within the cap 2 to jam against and force the disk or plate 11 toward the shoulder or seat of the bell, thereby closing the end of the pipe in a most effective manner. The flange 4 has an opening therein to give access to the screws 8 whereby they can be tightened and loosened when used as illustrated in Fig. 2.

Having thus described the invention, what is claimed as new is:

1. A pipe closure having a cap to fit over a spigot end of a pipe, and a plug to enter the bell end of a pipe, means for fastening either the cap or plug to a pipe, and means carried by the device for forcing a closure member against the end of the pipe.

2. A pipe closure having a cap to fit over the spigot end of a pipe, and a plug to fit within the bell end of a pipe, and set screws adapted to be screwed inwardly through the cap and outwardly through the plug.

3. A pipe closure having a cap to fit over the spigot end of a pipe, and a plug to fit within the bell end of a pipe, set screws adapted to be screwed inwardly through the cap and outwardly through the plug, and means carried by the device for forcing a closure member in either direction relative thereto.

4. A pipe closure having a cap to fit over the spigot end of a pipe, and a plug to fit within the bell end of a pipe, set screws adapted to be screwed inwardly through the cap and outwardly through the plug, and jam screws adapted to be screwed longitudinally in either direction for forcing a closure member against the end of the pipe.

5. A pipe closure embodying an annular body having end portions of different diameters to provide a cap of relatively large diameter and a plug of smaller diameter, and means movable inwardly relative to the cap for holding it upon the spigot end of a pipe and movable outwardly relative to the plug for holding it within the bell end of a pipe.

6. A pipe closure embodying an annular body having end portions of different diameters to provide a cap of relatively large diameter and a plug of smaller diameter, means movable inwardly relative to the cap for holding it upon the spigot end of a pipe and movable outwardly relative to the plug for holding it within the bell end of a pipe, and means carried by said body within the same for forcing a closure member in either direction.

7. A pipe closure embodying an annular body having end portions of different diameters to provide a cap of relatively large diameter and a plug of smaller diameter, set screws adapted to be screwed inwardly through the cap and outwardly through the plug for holding the cap upon the spigot end of a pipe or for holding the plug within the bell end of a pipe, and means carried by the body within the same for forcing a closure member in either direction.

8. A pipe closure embodying an annular body having end portions of different diameters to provide a cap of relatively large diameter and a plug of smaller diameter, set screws adapted to be screwed inwardly through the cap and outwardly through the plug for holding the cap upon the spigot end of a pipe or for holding the plug within the bell end of a pipe, the body having an inwardly projecting flange between the cap and plug, and jam screws adapted to be threaded in either direction through said flange for forcing a closure member in either direction.

In testimony that I claim the foregoing as my own, I have hereto affixed my signature in the presence of two witnesses.

WILLIAM R. CONARD.

Witnesses:
J. S. BUZBY,
WM. E. TAYLOR.

Copies of this patent may be obtained for five cents each, by addressing the "Commissioner of Patents, Washington, D. C."